United States Patent
Kurafuji

(10) Patent No.: US 7,080,185 B2
(45) Date of Patent: Jul. 18, 2006

(54) BUS CONTROL DEVICE ALTERING DRIVE CAPABILITY ACCORDING TO CONDITION

(75) Inventor: Takashi Kurafuji, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 350 days.

(21) Appl. No.: 10/295,916

(22) Filed: Nov. 18, 2002

(65) Prior Publication Data

US 2003/0221031 A1 Nov. 27, 2003

(30) Foreign Application Priority Data

May 21, 2002 (JP) ............................. 2002-146296

(51) Int. Cl.
*G06F 13/14* (2006.01)
*H03F 3/00* (2006.01)
*H01L 25/00* (2006.01)
*H03K 19/0175* (2006.01)

(52) U.S. Cl. ......................... 710/305; 330/192; 326/47; 326/87

(58) Field of Classification Search ................ 710/305, 710/308; 330/192; 326/83, 87, 47
See application file for complete search history.

(56) References Cited

U.S. PATENT DOCUMENTS

| | | | | |
|---|---|---|---|---|
| 5,153,450 A | * | 10/1992 | Ruetz | 326/87 |
| 5,949,254 A | * | 9/1999 | Keeth | 326/87 |
| 6,097,219 A | * | 8/2000 | Urata et al. | 326/83 |
| 6,194,913 B1 | * | 2/2001 | Verkinderen et al. | 326/83 |
| 6,313,664 B1 | * | 11/2001 | Hall et al. | 326/83 |
| 6,759,868 B1 | * | 7/2004 | Helt et al. | 326/30 |

FOREIGN PATENT DOCUMENTS

| | | |
|---|---|---|
| JP | 7-226439 | 8/1995 |
| JP | 10-312230 | 11/1998 |
| JP | 11-25678 | 1/1999 |

* cited by examiner

*Primary Examiner*—Rehana Perveen
*Assistant Examiner*—Jeremy S. Cerullo
(74) *Attorney, Agent, or Firm*—McDermott Will & Emery LLP

(57) ABSTRACT

An access destination determining section determines whether an access is directed to region 1 or region 2. A region 1 drive capability register and a region 2 drive capability register set drive capabilities of output buffers when accesses to region 1 and region 2 generate, respectively. For example, if "1" is set to region 1 drive capability register, when an access to region 1 generates, a Buf2 output enable signal is output at high level to enable outputs of Buf2s. Therefore, a drive capability of a bus can be altered according to a region to which an access is made by a CPU or the like, thereby enabling prevention of unnecessary power consumption and generation of noise.

6 Claims, 5 Drawing Sheets

BUS CONTROL DEVICE ALTERING DRIVE CAPABILITY ACCORDING TO CONDITION

BACKGROUND OF THE INVENTION

1. Field of the Invention

The present invention relates to a technique controlling a drive capability of a bus such as a data bus or an address bus, and more particularly to a bus control device capable of altering a drive capability of a bus according to a region to which an access is made by a CPU (Central Processing Unit) or the like, an operating condition for the bus or the like.

2. Description of the Background Art

In recent years, a system on which a CPU is mounted has been progressed in its high functionality and multi-functionality and along this progress, various semiconductor devices have been connected to a bus in the system. Since kinds and the number of semiconductor devices connected to a bus are different according to a system and, in addition, a load capacity of a bus varies according to a system, a drive capability of an output buffer for a semiconductor device is demanded in various ways.

In such circumstances, development has been heretofore made on various bus control devices each capable of altering a drive capability of an output buffer according to a load capacity of an external bus and one example thereof includes an output buffer device with a drive capability switch function that is disclosed in Japanese Patent Laying-Open No. 10-312230. In the output buffer device with a drive capability switch function, switching is made between drive capabilities of an output buffer on the basis of a response time and a set time when an internal signal is output to an external device.

With the output buffer device with a drive capability switch function provided, unnecessary power consumption and generation of noise can be suppressed by altering an drive capability of an output buffer according to a change in a load capacity of an external bus of a semiconductor device due to changes in kind and number of devices connected to outside even if the change generates.

In the above described output buffer device with a drive capability switch function, in a case where a load capacity of a external bus of a semiconductor device takes a specific value, a drive capability of an output buffer is determined so as to satisfy a drive capability of a device with characteristics of the minimal required values for a delay time, and rise and fall times of a bus signal, of semiconductor devices connected to an external bus.

Of semiconductor devices connected to the same external bus, however, such a drive capability is in excess of requirement to a device with characteristics of larger required values for a delay time, and rise and fall times of a bus signal and the bus is driven to an excessive level when an access is made to the device, having resulted in a problem causing unnecessary power consumption and generation of noise.

Furthermore, in a case where a frequency of an operating clock for a CPU or the like is lowered in order to operate an external bus in a low power consumption mode as well, a bus is driven to an excessive level, also having led to a problem causing unnecessary power consumption and generation of noise.

SUMMARY OF THE INVENTION

It is an object of the present invention to provide a bus control device capable of preventing unnecessary power consumption and generation of noise by altering a drive capability of a bus according to a region to which an access is made by a CPU or the like.

It is another object of the present invention to provide a bus control device capable of preventing unnecessary power consumption and generation of noise by altering a drive capability of a bus according to the number of bus waits.

It is still another object of the present invention to provide a bus control device capable of preventing unnecessary power consumption and generation of noise by altering a drive capability of a bus according to a bus operating frequency.

According to an aspect of the present invention, a bus control device includes: a plurality of output buffers connected to respective bus signals; an access destination determining section determining to which of a plurality of regions an access is made; a drive capability register in which a drive capability of a bus is set correspondingly to the plurality of regions; and a logic circuit altering a drive capability of a bus by controlling the plurality of output buffers on the basis of a result of determination by the access destination determining section and a drive capability of a bus set in a drive capability register.

Since the logic circuit controls the plurality of output buffers according to a region at an access destination and a drive capability of a bus corresponding thereto, the drive capability of a bus can be altered according to a region to which an access is made by a CPU or the like, thereby enabling prevention of unnecessary power consumption and generation of noise.

According to another aspect of the present invention, a bus control device includes: a plurality of output buffers connected to respective bus signals; a number-of-waits register in which the number of bus waits is set; a wait threshold value register in which a threshold value of the number of bus waits is set; and a logic circuit altering a drive capability of a bus by controlling the plurality of output buffers on the basis of a result of comparison between the number of bus waits set in the number-of-waits register and a threshold value of the number of waits set in the wait threshold value register.

Since the logic circuit controls the plurality of output buffers by comparing the number of bus waits and a threshold value of the number of bus waits with each other, a drive capability of a bus can be altered according to the number of bus waits, thereby enabling prevention of unnecessary power consumption and generation of noise.

According to still another aspect of the present invention, a bus control device includes: a plurality of output buffers connected to respective bus signals; a frequency threshold value register in which a threshold value of a bus operating frequency is set; and a logic circuit altering a drive capability of a bus by controlling the plurality of output buffers on the basis of a result of comparison between a bus operating frequency and a threshold value of a bus operating frequency set in the frequency threshold value register.

Since the logic circuit controls the plurality of output buffers by comparing a bus operating frequency and a threshold value of a bus operating frequency with each other, a drive capability of a bus can be altered according to the bus operating frequency, thereby enabling prevention of unnecessary power consumption and generation of noise.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
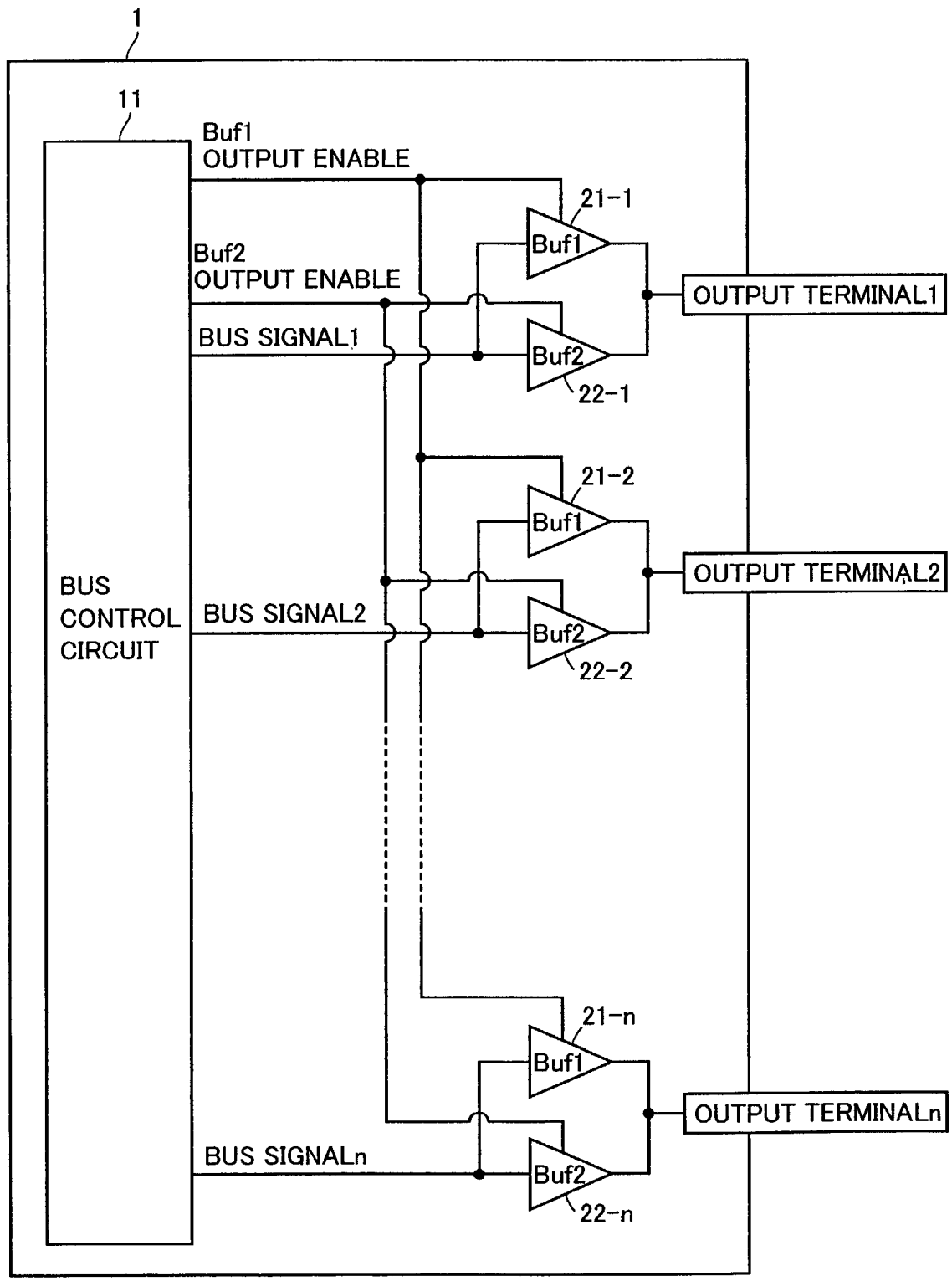
FIG. 1 is a block diagram showing a schematic configuration of a semiconductor device on which a bus control device is mounted in a first embodiment of the present invention.

FIG. 1 is a block diagram showing a schematic configuration of a semiconductor device on which a bus control device is mounted in a first embodiment of the present invention. A semiconductor device 1 includes: a bus control circuit 11; buffers 1 (hereinafter referred to as Buf1) 21-1 to 21-n connected to respective output terminals 1 to n; and buffers 2 (hereinafter referred to as Buf2) 22-1 to 22-n connected to respective output terminals 1 to n. Note that Buf1s (21-1 to 21-n) and Buf2s (22-1 to 22-n), both provided correspondingly to respective output terminals 1 to n, are each referred to as an output buffer section. In addition, bus control circuit 11 and output buffer sections are collectively referred to as a bus control device. Buf1s (21-1 to 21-n) and Buf2s (22-1 to 22-n) may have either the same drive capability as, or drive capabilities different from each other.

A Buf1 output enable signal output from bus control circuit 11 is connected to output enable terminals of Buf1s (21-1 to 21-n). A Buf2 output enable signal output from bus control circuit 11 is connected to output enable terminals of Buf2s (22-1 to 22-n).

Bus signals 1 to n output from bus control circuit 11 are connected to internal buses such as a data bus, an address bus and the like which are not shown in semiconductor device 1. Bus signal 1 is connected to data input terminals of Buf1 (21-1) and Buf2 (22-1). Bus signal 2 is connected to data input terminals of Buf1 (21-2) and Buf2 (22-2). Similar to the above, bus signal n is connected to data input terminals of Buf1 (21-n) and Buf2 (22-n).

Data output terminals of Buf1 (21-1) and Buf2 (22-1) are connected to output terminal 1, respectively. Data output terminals of Buf1 (21-2) and Buf2 (22-2) are connected to output terminal 2, respectively. Similar to the above, data output terminals of Buf1 (21-n) and Buf2 (22-n) are connected to output terminal n, respectively.

Buf1s (21-1 to 21-n) output values of data input terminals to data output terminals as they are when Buf1 output enable signal is at high level (hereinafter abbreviated as H level). Buf1s (21-1 to 21-n) causes data output terminals to be in high impedance state when Buf1 output enable signal is at low level (hereinafter abbreviated as L level).

Similar to the above, Buf2s (22-1 to 22-n) output values of data input terminals to data output terminals as they are when Buf2 output enable signal is at H level. Buf2s (22-1 to 22-n) cause data output terminals to be in high impedance state when Buf2 output enable signal is at L level.

Figure 2:
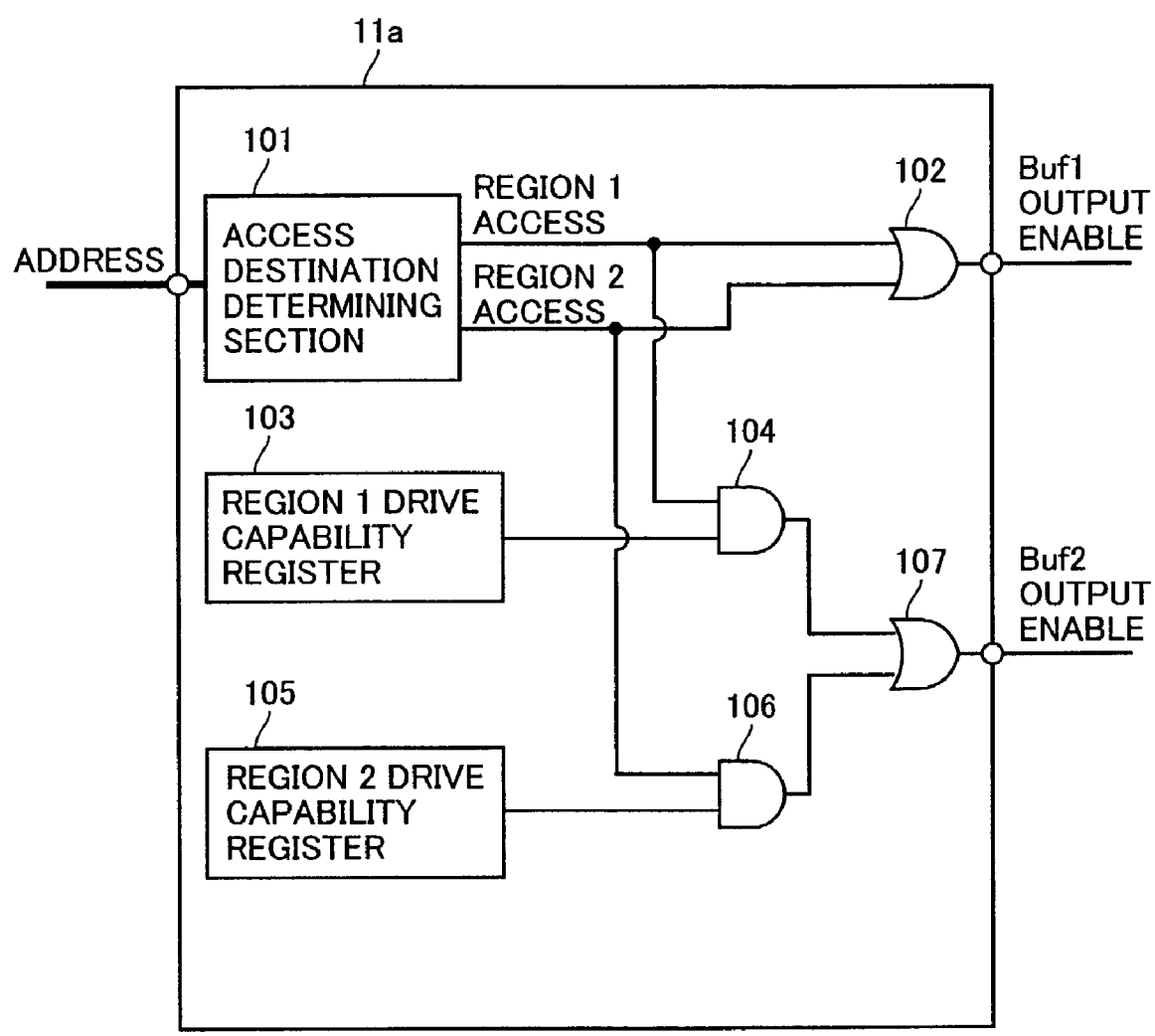
FIG. 2 is a block diagram showing a configuration of a bus control circuit 11a in the first embodiment of the present invention.

FIG. 2 is a block diagram showing a configuration of a bus control circuit 11a in the first embodiment of the present invention. Bus control circuit 11a includes: an access destination determining section 101 decoding an address output from a CPU which is not shown or the like to determine an access destination; a region 1 drive capability register 103 setting a drive capability corresponding to a region 1 determined by access destination determining section 101; a region 2 drive capability register 105 setting a drive capability corresponding to a region 2 determined by access destination determining section 101; OR circuits 102 and 107; and AND circuits 104 and 106. Note that region 1 drive capability register 103 and region 2 drive capability register 105 are registers accessible from the CPU or the like.

Access destination determining section 101 divides semiconductor device 1 allocated in an address space of the CPU or the like into two regions and determines whether an access by the CPU or the like is directed to region 1 or region 2. In a case where an access is directed to region 1, access destination determining section 101 outputs a region 1 access signal at H level and a region 2 access signal at L level. In a case where an access is directed to region 2, access destination determining section 101 outputs region 2 access signal at H level and region 1 access signal at L level.

Region 1 drive capability register 103 is a register for setting a drive capability of an output buffer section when an access to region 1 generates, wherein when "1" is set, it indicate that a drive capability of the output buffer section increases, while when "0" is set, it indicate that a drive capability of the output buffer section decreases.

Region 2 drive capability register 105 is a register for setting a drive capability of an output buffer section when an access to region 2 generates, wherein when "1" is set, it indicate that a drive capability of the output buffer section increases, while when "0" is set, it indicate that a drive capability of the output buffer section decreases.

OR circuit 102 outputs Buf1 output enable signal at H level when region 1 access signal or region 2 access signal is at H level. Therefore, in any of accesses to region 1 and region 2, outputs of Buf1 (21-1 to 21-n) are enabled.

AND circuit 104 outputs a signal at L level to OR circuit 107 in a case where "0" is set in region 1 drive capability register 103 even when region 1 access signal is at H level. That is, when an access to region 1 generates in a case where a drive capability is set so as to be small, OR circuit 107 outputs Buf2 output enable signal at L level to cause Buf2s (22-1 to 22-n) to be in high impedance state.

AND circuit 104 outputs a signal at H level to OR circuit 107 in a case where region 1 access signal is at H level and "1" is set in region 1 drive capability register 103. That is, when an access to region 1 generates in a case where a drive capability is set so as to be large, OR circuit 107 outputs Buf2 output enable signal at H level to enable an outputs of Buf2s (22-1 to 22-n).

AND circuit 106 outputs a signal at L level to OR circuit 107 in a case where "0" is set in region 2 drive capability register 105 even when region 2 access signal is at H level. That is, when an access to region 2 generates in a case where a drive capability is set so as to be small, OR circuit 107 outputs Buf2 output enable signal at L level to cause Buf2s (22-1 to 22-n) to be in high impedance.

AND circuit 106 outputs a signal at H level to OR circuit 107 in a case where region 2 access signal is at H level and "1" is set in region 2 drive capability register 105. That is, when an access to region 2 generates in a case where a drive capability is set so as to be large, OR circuit 107 outputs Buf2 output enable signal at H level to enable outputs of Buf2s (22-1 to 22-n).

Note that while in this embodiment, driving of Buf1s (21-1 to 21-n) and Buf2s (22-1 to 22-n) are controlled according to values set in region 1 drive capability register 103 and region 2 drive capability register 105, driving of Buf1s (21-1 to 21-n) and Buf2s (22-1 to 22-n) may be controlled by setting values directly to external pins instead of use of registers.

According to the bus control device in this embodiment, as described above, since bus control circuit 11a controls driving of Buf1s (21-1 to 21-n) and Buf2s (22-1 to 22-n) according to values set in region 1 drive capability register 103 and region 2 drive capability register 105 and to which of region 1 and region 2 an access is directed to, for example, a drive capability of an output buffer section can be larger in a case where an access is made to a device requiring a shorter delay time in a bus, while a drive capability of an output buffer section can be smaller in a case where an access is made to a device having no necessity for a shorter delay time in a bus, thereby enabling prevention of unnecessary power consumption and generation of noise.

Second Embodiment

A schematic configuration of a semiconductor device on which a bus control device is mounted in a second embodiment of the present invention is similar to the schematic configuration of the semiconductor device on which the bus control device is mounted in the first embodiment shown in FIG. 1. Therefore, no detailed description of duplicated parts of the configuration and functions thereof will be repeated.

Figure 3:
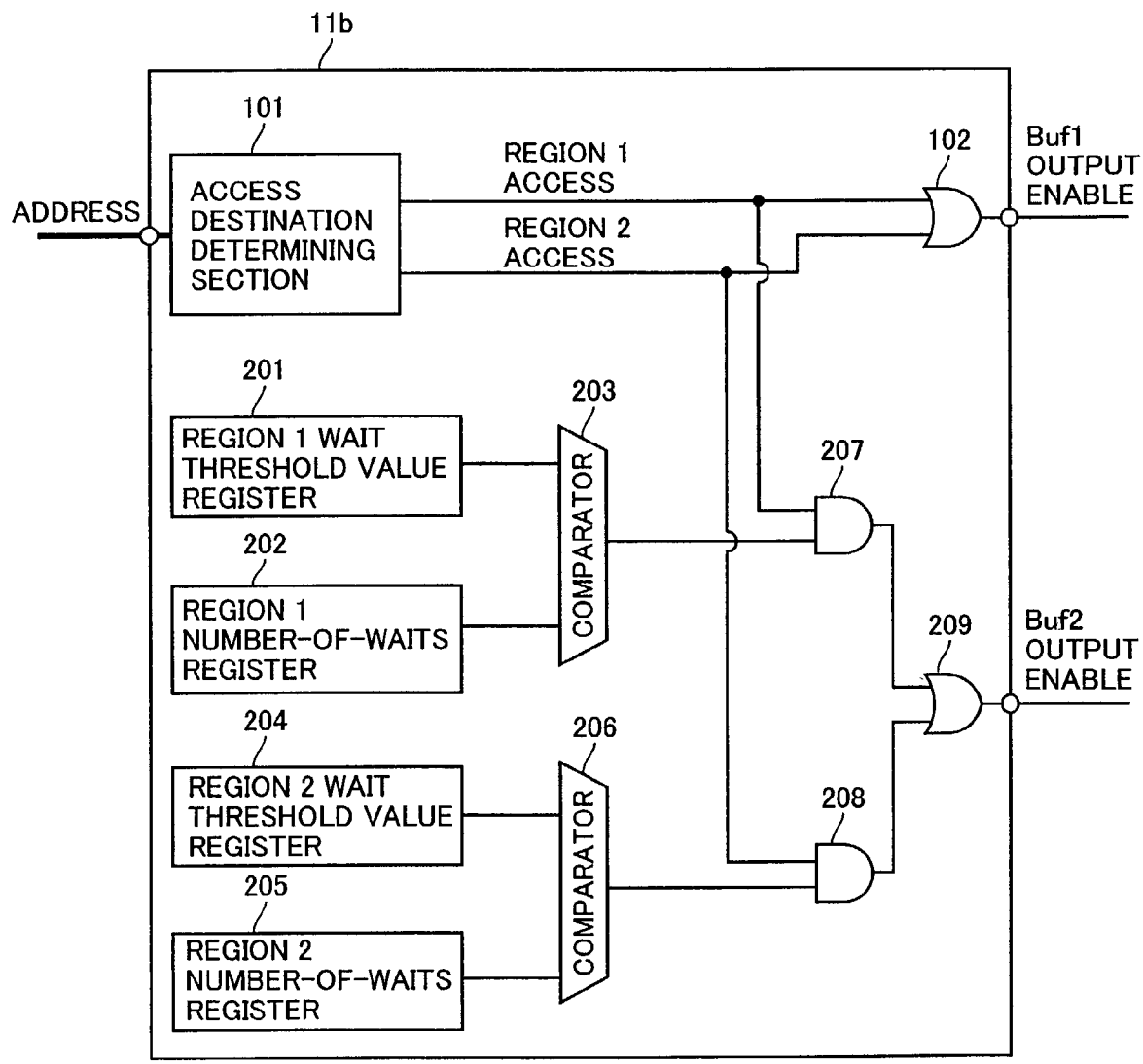
FIG. 3 is a block diagram showing a configuration of a bus control circuit 11b in a second embodiment of the present invention.

FIG. 3 is a block diagram showing a configuration of a bus control circuit 11b in the second embodiment of the present invention. Bus control circuit 11b includes: an access destination determining section 101 decoding an address output from the CPU which is not shown or the like to determine an address destination; a region 1 wait threshold value register 201 in which there is set a threshold value of the number of waits when an access is made to region 1 determined by access destination determining section 101; a region 1 number-of-waits register 202 in which there is set the number of waits when an access is made to region 1; a region 2 wait threshold value register 204 in which there is set a threshold value of the number of waits when an access is made to region 2 determined by access destination determining section 101; a region 2 number-of-waits register 205 in which there is set the number of waits when an access is made to region 2; comparators 203 and 206; OR circuits 102 and 209; and AND circuits 207 and 208. Note that region 1 wait threshold value register 201, region 1 number-of-waits register 202, region 2 wait threshold value register 204 and region 2 number-of-waits register 205 are all accessible from the CPU or the like.

Access destination determining section 101 divides semiconductor device 1 allocated in an address space of the CPU or the like into two regions and determines whether an access by the CPU or the like is directed to region 1 or region 2. In a case where an access is directed to region 1, access destination determining section 101 outputs a region 1 access signal at H level and a region 2 access signal at L level. In a case where an access is directed to region 2, access destination determining section 101 outputs a region 2 access signal at H level and a region 1 access signal at L level.

Region 1 wait threshold value register 201 is a register for setting a threshold value of the number of bus waits used in determination on whether or not switching is made between drive capabilities of an output buffer section when an access is made to region 1 by the CPU or the like.

Region 1 number-of-waits register 202 is a register for setting the number of bus waits when an access is made to region 1 by the CPU or the like.

Comparator 203 compares the number of bus waits set in region 1 number-of-waits register 202 and a threshold value of the number of bus waits set in region 1 wait threshold value register 201 with each other and when the number of bus waits set in region 1 number-of-waits register 202 is smaller than a threshold value of the number of bus waits set in region 1 wait threshold value register 201, comparator 203 outputs an output signal at H level to AND circuit 207. On the other hand, when the number of bus waits set in region 1 number-of-waits register 202 is equal to or larger than a threshold value of the number of bus waits set in region 1 wait threshold value register 201, comparator 203 outputs an output signal at L level to AND circuit 207.

Region 2 wait threshold value register 204 is a register for setting a threshold value of the number of bus waits used in determination on whether or not switching is made between drive capabilities of an output buffer section when an access is made to region 2 by the CPU or the like.

Region 2 number-of-waits register 205 is a register for setting the number of bus waits when an access is made to region 2 by the CPU or the like.

Comparator 206 compares the number of bus waits set in region 2 number-of-waits register 205 and a threshold value of the number of bus waits set in region 2 wait threshold value register 204 with each other and when the number of bus waits set in region 2 number-of-waits register 205 is smaller than a threshold value of the number of bus waits set in region 2 wait threshold value register 204, comparator 206 outputs an output signal at H level to AND circuit 208. On the other hand, when the number of bus waits set in region 2 number-of-waits register 205 is equal to or larger than a threshold value of the number of bus waits set in region 2 wait threshold value register 204, comparator 206 outputs an output at L level to AND circuit 208.

OR circuit 102 outputs Buf1 output enable signal at H level when region 1 access signal or region 2 access signal is at H level. Therefore, in any of accesses to region 1 and region 2, outputs of Buf1s (21-1 to 21-n) are enabled.

AND circuit 207 outputs a signal at L level to OR circuit 209 in a case where comparator 203 outputs a signal at L level even when region 1 access signal is at H level. That is, when an access to region 1 generates in a case where the number of waits set in region 1 number-of-waits register 202 is equal to or larger than a threshold value of the number of bus waits set in region 1 wait threshold value register 201, OR circuit 209 outputs Buf2 output enable signal at L level to cause Buf2s (22-1 to 22-n) to be in high impedance state.

AND circuit 207 outputs a signal at H level to OR circuit 209 in a case where region 1 access signal is at H level and comparator 203 outputs a signal at H level. That is, when an access to region 1 generates in a case where the number of bus waits set in region 1 number-of-waits register 202 is smaller than a threshold value of the number of the bus waits set in region 1 wait threshold value register 201, OR circuit 209 outputs Buf2 output enable signal at H level to enable outputs of Buf2s (22-1 to 22-n).

AND circuit 208 outputs a signal at L level to OR circuit 209 in a case where comparator 206 outputs a signal at L level even when region 2 access signal is at H level. That is, when an access to region 2 generates in a case where the number of bus waits set in region 2 number-of-waits register 205 is equal to or larger than a threshold value of the number of bus waits set in region 2 wait threshold value register 204, OR circuit 209 outputs Buf2 output enable signal at L level to cause Buf2s (22-1 to 22-n) to be in high impedance state.

AND circuit 208 outputs a signal at H level to OR circuit 209 in a case where region 2 access signal is at H level and comparator 206 outputs a signal at H level. That is, when an access to region 2 generates in a case where the number of bus waits set in region 2 number-of-waits register 205 is smaller than a threshold value of the number of the bus waits set in region 2 wait threshold value register 204, OR circuit 209 outputs Buf2 output enable signal at H level to enable outputs of Buf2s (22-1 to 22-n).

Note that in a case where "0" is set in region 1 wait threshold value register 201, only outputs of Buf1s (21-1 to 21-n) can be enabled regardless of a value set in region 1 number-of-waits register 202 when an access to region 1 generates. Furthermore, in a case where a value larger than the maximum that can be set in region 1 number-of-waits register 202 is set in a region 1 wait threshold value register 201, outputs of Buf1s (21-1 to 21-n) and Buf2s (22-1 to 22-n) can be enabled regardless of a value set in region 1 number-of-waits register 202, when an access to region 1 generates.

Similar to the above, in a case where "0" is set in region 2 wait threshold value register 204, only outputs of Buf1s (21-1 to 21-n) can be enabled regardless of a value set in region 2 number-of-waits register 205 when an access to region 2 generates. Furthermore, in a case where a value larger than the maximum that can be set in region 2 number-of-waits register 205 is set in a region 2 wait threshold value register 204, outputs of Buf1s (212-1 to 21-n) and Buf2s (22-1 to 22-n) can be enabled regardless of a value set in region 2 number-of-waits register 205, when an access to region 2 generates.

Note that while in this embodiment, driving of Buf1s (21-1 to 21-n) and Buf2s (22-1 to 22-n) is controlled according to values set in region 1 number-of-waits register 202 and region 1 wait threshold value register 201 or values set in region 2 number-of-waits register 205 and region 2 wait threshold value register 204, driving of Buf1s (212-1 to 21-n) and Buf2s (22-1 to 22-n) may be controlled by setting values directly to external pins instead of use of registers.

According to the bus control device in this embodiment, as described above, since bus control circuit 11b controls driving of Buf1s (21-1 to 21-n) and Buf2s (22-1 to 22-n) according to a result of comparison of the number-of-waits set in region 1 number-of-waits register 202 and a threshold value of the number of bus waits set in region 1 wait threshold value register 201 with each other, to a result of comparison of the number of bus waits set in region 2 number-of-waits register 205 and a threshold value of the number of bus waits set in region 2 wait threshold value register 204 with each other and to which of region 1 and region 2 an access is made to, a driving capability of an output buffer section can increase in a case where an access is made to a device with the number of bus waits smaller than a threshold value and requiring decrease in delay time in a bus, while a driving capability of an output buffer section can decrease in a case where an access is made to a device with the number of bus waits equal to or larger than a threshold value and having no necessity for a shorter delay time in a bus, thereby enabling prevention of unnecessary power consumption and generation of noise.

Third Embodiment

A schematic configuration of a semiconductor device on which a bus control device is mounted in a third embodiment of the present invention is similar to the schematic configuration of the semiconductor device on which the bus control device is mounted in the first embodiment shown in FIG. 1. Therefore, no detailed description of duplicated parts of the configuration and functions thereof will be repeated.

Figure 4:
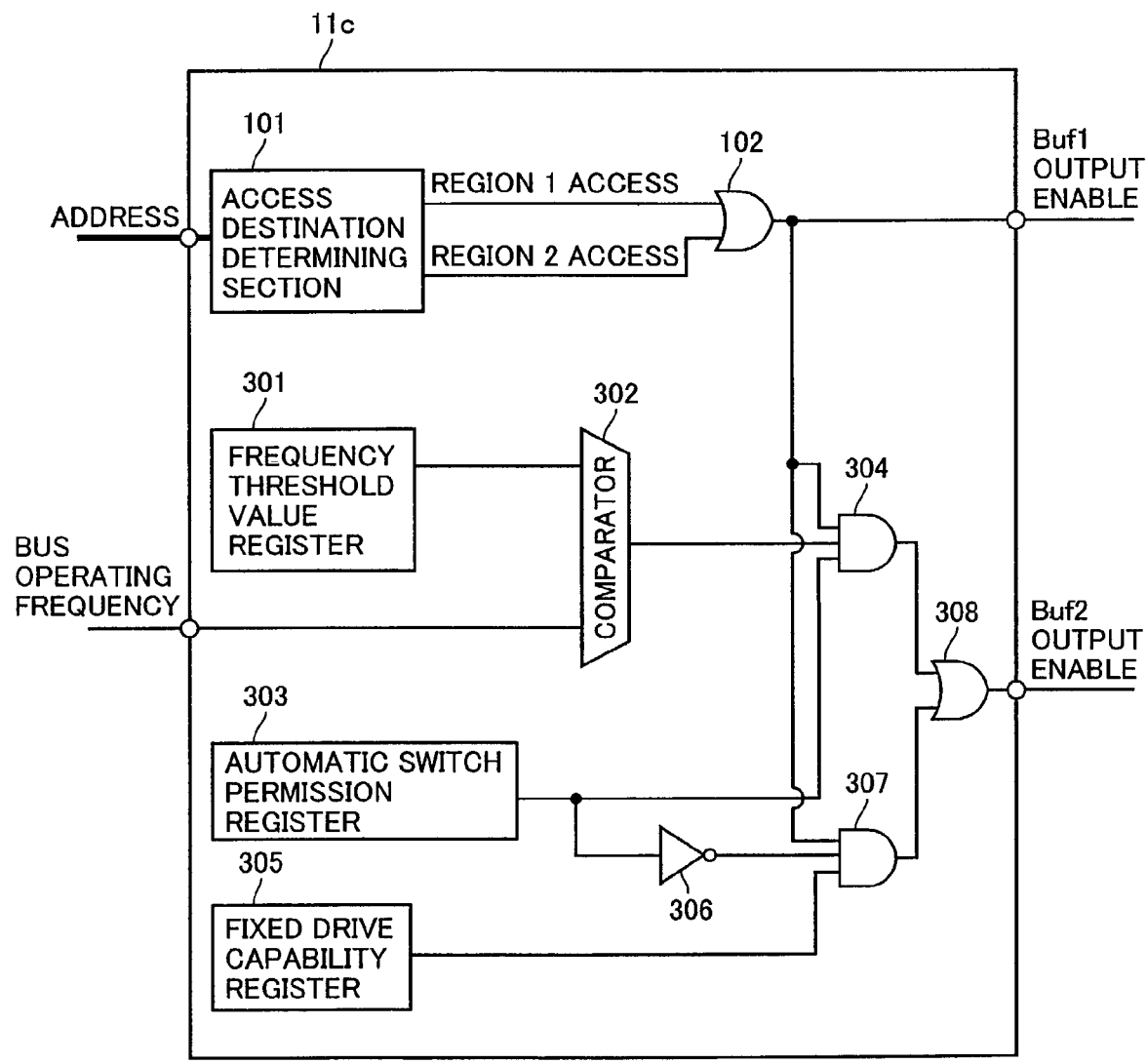
FIG. 4 is a block diagram showing a configuration of a bus control circuit 11c in a third embodiment of the present invention.

FIG. 4 is a block diagram showing a configuration of a bus control circuit 11c in the third embodiment of the present invention. Bus control device 11c includes: an access destination determining section 101 decoding an address output from the CPU which is not shown or the like to determine an access destination; a frequency threshold value register 301 in which a threshold value of a bus operating frequency is set; an automatic switch permission register 303 in which setting is effected of information on whether or not automatic switching between drive capabilities of an output buffer section corresponding to a bus operating frequency is permitted; a fixed drive capability register 305 in which a fixed value of a drive capability of an output buffer section is set in a case where prohibition against automatic switching is set in automatic switch permission register 303; a comparator 302; OR circuits 102 and 308; AND circuits 304 and 307; and an inverter 306. Note that frequency threshold value register 301, automatic switch permission register 303 and fixed drive capability register 305 are registers that can be accessed by the CPU or the like.

Access destination determining section 101 divides semiconductor device 1 allocated in an address space of the CPU or the like into two regions and determines whether an access by the CPU or the like is directed to region 1 or region 2. In a case where an access is directed to region 1, access destination determining section 101 outputs a region 1 access signal at H level and a region 2 access signal at L level. In a case where an access is directed to region 2, access destination determining section 101 outputs region 2 access signal at H level and region 1 access signal at L level.

Frequency threshold value register 301 is a register for setting a threshold value of a bus operating frequency used in determination on whether or not switching is made between drive capabilities of an output buffer section when an access has been made to region 1 or region 2 by the CPU or the like.

Automatic switch permission register 303 is a register for setting information on whether or not permission is given to automatic switching between drive capabilities of an output buffer section corresponding to a bus operating frequency. The value "1" is set in automatic switch permission register 303 in a case where automatic switching is permitted between drive capabilities of an output buffer section, while in a case where automatic switching is prohibited between drive capabilities of the output buffer section, "0" is set in automatic switch permission resister 303.

Fixed drive capability register 305 is a register for setting a fixed value of drive capability of an output buffer section when an access has been made to region 1 or region 2 in a case where prohibition of automatic switching between drive capabilities of the output buffer section is set in automatic switch permission register 303.

Comparator 302 compares a bus operating frequency indicated by a bus operating frequency signal input externally and a threshold value of a bus operating frequency set in frequency threshold register 301 with each other and outputs a signal at H level to AND circuit 304, when a bus operating frequency indicated by a bus operating frequency signal is larger than a threshold value of bus operating frequency set in frequency threshold value register 301. On the other hand, comparator 302 outputs a signal at L level to AND circuit 304 when a bus operating frequency indicated by a bus operating frequency signal is equal to or smaller than a threshold value of bus operating frequency set in frequency threshold value register 301.

OR circuit 102 outputs Buf1 output enable signal at H level when region 1 access signal or region 2 access signal is at H level. Therefore, in any of accesses to region 1 and region 2, outputs of Buf1s (21-1 to 21-n) are enabled.

AND circuit 304 outputs a signal at L level to OR circuit 308 in a case where comparator 302 outputs an output at L level or "0" is set in automatic switch permission register 303 even when region 1 access signal or region 2 access signal is at H level. That is, when an access to region 1 or region 2 generates in a case where a bus operating frequency indicated by a bus operating frequency signal is equal to or smaller than a threshold value of a bus operating frequency set in frequency threshold value register 301 or in a case where prohibition of automatic switching is set in automatic switch permission register 303, OR circuit 308 outputs Buf2 output enable signal at L level to cause Buf2s (22-1 to 22-n) to be in high impedance.

AND circuit 304 outputs a signal at H level to OR circuit 308 in a case where region 1 access signal or region 2 access signal is at H level, comparator 302 outputs a signal at H level and "1" is set in automatic switch permission register 303. That is, when an access to region 1 or region 2 generates in a case where a bus operating frequency indicated by a bus operating frequency signal is larger than a threshold value of a bus operating frequency set in frequency threshold value register 301 and permission of automatic switching is set in automatic switch permission register 303, OR circuit 308 outputs Buf2 output enable signal at H level to enable outputs of Buf2s (22-1 to 22-n).

AND circuit 307 outputs a value set in fixed drive capability register 305 as it is to OR circuit 308 in a case where region 1 access signal or region 2 access signal is at H level and "0" is set in automatic switch permission register 303. That is, when an access to region 1 or region 2 generates in a case where prohibition of automatic switching is set in automatic switch permission register 303, OR circuit 308 outputs a value set in fixed drive capability register 305 as Buf2 output enable signal to control outputs of Buf2s (22-1 to 22-n).

Note that while in this embodiment, driving of Buf1s (21-1 to 21-n) and Buf2s (22-1 to 22-n) are controlled according to values set in frequency threshold value register 301, automatic switch permission register 303 and fixed drive capability register 305, driving of Buf1s (21-1 to 21-n) and Buf2s (22-1 to 22-n) may be controlled by setting values directly to external pins or the like instead of use of registers.

According to the bus control device in this embodiment, as described above, since bus control device 11c controls driving of Buf1s (21-1 to 21-n) and Buf2s (22-1 to 22-n) according to a comparison result between a bus operating frequency indicated by a bus operating frequency signal and a threshold value of a bus operating frequency set in frequency threshold value register 301, a drive capability of an output buffer section can increase in a case where an access is made to a device requiring a bus operating frequency larger than a threshold value and a shorter delay time in a bus, while a drive capability of an output buffer section can be smaller in a case where an access is made to a device having a bus operating frequency equal to or smaller than a threshold value and no necessity for a shorter delay time in a bus, thereby enabling prevention of unnecessary power consumption and generation of noise.

By setting "0" in automatic switch permission register 303, a driving of an output buffer section can be controlled according to a value set in fixed drive capability register 305 regardless of a bus operating frequency.

Fourth Embodiment

While in the bus control device in the first embodiment of the present invention, semiconductor device 1 allocated in an address space of the CPU or the like is divided into two regions and it is determined to which of the regions an access is made to set two kinds of drive capabilities in an output buffer section, in the fourth embodiment, semiconductor device 1 allocated in an address space of the CPU or the like is divided into four regions and it is determined to which of the four regions an access is made to set four kinds of drive capabilities in an output buffer section. Note that a case where an address space is divided into five or more regions and a case where five or more kinds of drive capabilities are set in an output buffer as well, a configuration can be formed in a similar manner to the bus control device in this embodiment.

Figure 5:
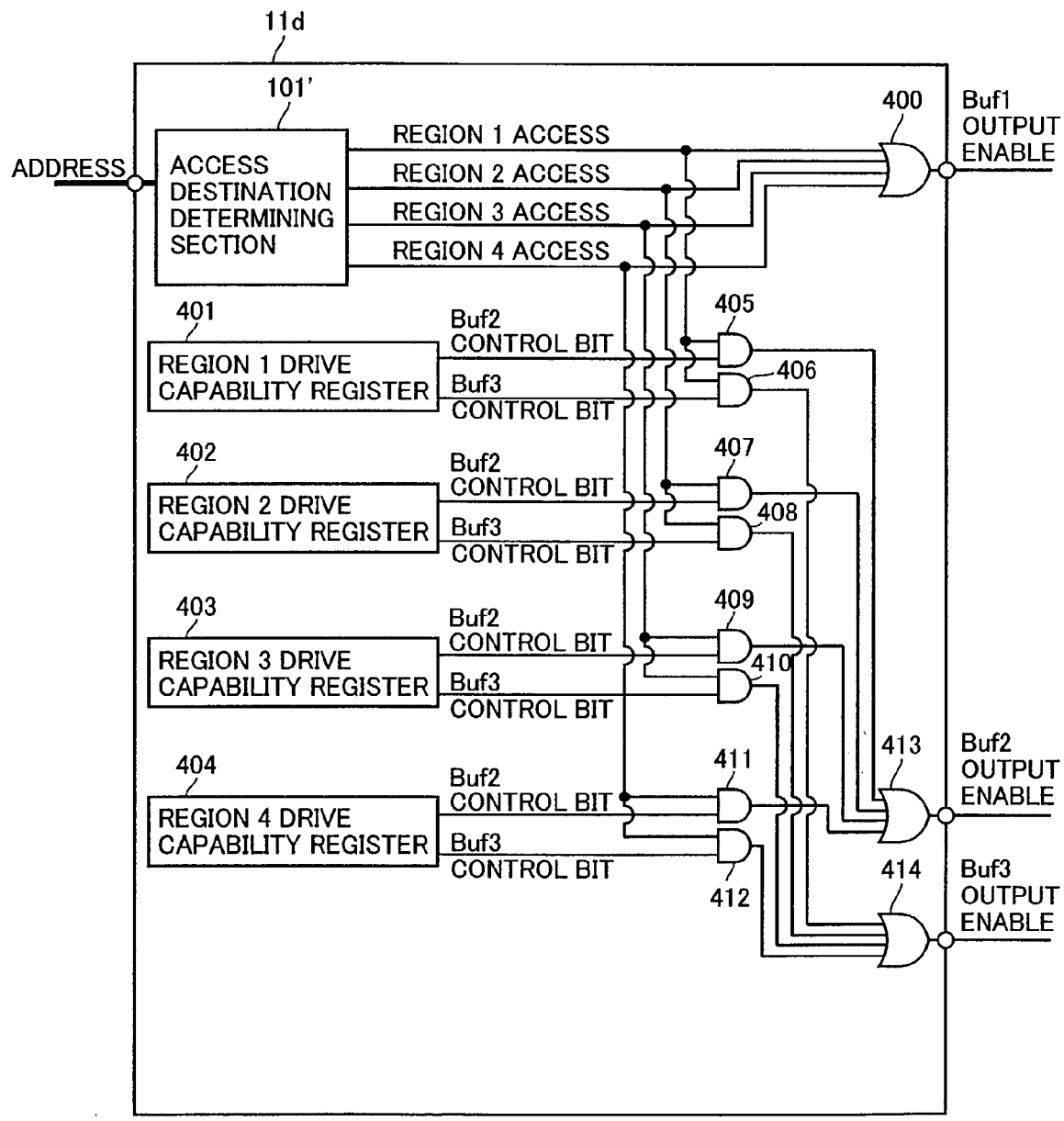
FIG. 5 is a block diagram showing a configuration of a bus control circuit 11d in a fourth embodiment of the present invention.

FIG. 5 is a block diagram showing a configuration of a bus control circuit 11d in a fourth embodiment of the present invention. Bus control circuit 11d includes: an access destination determining section 101' decoding an address output from CPU which is not shown or the like determine an access destination; region 1 drive capability register 401 setting a drive capability corresponding to region 1 determined by access destination determining section 101'; region 2 drive capability register 402 setting a drive capability corresponding to region 2 determined by access destination determining section 101'; region 3 drive capability register 403 setting a drive capability corresponding to region 3 determined by access destination determining section 101'; region 4 drive capability register 404 setting a drive capability corresponding to region 4 determined by access destination determining section 101'; OR circuits 400, 413 and 414; and AND circuits 405 to 412. Note that region 1 drive capability register 401, region 2 drive capability register 402, region 3 drive capability register 403 and region 4 drive capability register 404 are registers that can be accessed by the CPU or the like.

Access destination determining section 101' divides semiconductor device 1 allocated in an address space of the CPU or the like into four regions and it is determined to which of regions 1 to 4 an access is made by the CPU or the like.

In a case of an access to region 1, access destination determining section 101' outputs region 1 access signal at H level while outputting region 2 access signal, region 3 access signal and region 4 access signal all at L level.

In a case of an access to region 2, access destination determining section 101' outputs region 2 access signal at H level while outputting region 1 access signal, region 3 access signal and region 4 access signal all at L level.

In a case of an access to region 3, access destination determining section 101' outputs region 3 access signal at H level while outputting region 1 access signal, region 2 access signal and region 4 access signal all at L level.

In a case of an access to region 4, access destination determining section 101' outputs region 4 access signal at H level while outputting region 1 access signal, region 2 access signal and region 3 access signal all at L level.

Region 1 drive capability register 401 is a 2 bit register for setting a drive capability of an output buffer section when an access to region 1 generates. When an access to region 1 generates, an output of an output buffer corresponding to a bit to which "1" is set of region 1 drive capability register 401 is enabled.

Region 2 drive capability register 402 is a 2 bit register for setting a drive capability of an output buffer section when an access to region 2 generates. When an access to region 2 generates, an output of an output buffer corresponding to a bit to which "1" is set of region 2 drive capability register 402 is enabled.

Region 3 drive capability register 403 is a 2 bit register for setting a drive capability of an output buffer section when an access to region 3 generates. When an access to region 3 generates, an output of an output buffer corresponding to a bit to which "1" is set of region 3 drive capability register 403 is enabled.

Region 4 drive capability register 404 is a 2 bit register for setting a drive capability of an output buffer section when an access to region 4 generates. When an access to region 4 generates, an output of an output buffer corresponding to a bit to which "1" is set of region 4 drive capability register 404 is enabled.

OR circuit 400 outputs Buf1 output enable signal at H level when region 1 access signal, region 2 access signal, region 3 access signal or region 4 access signal is at H level. Therefore, outputs of Buf1s (21-1 to 21-n) are enabled when an access is directed to any of region 1 to region 4.

AND circuit 405 outputs a signal at L level to OR circuit 413 in a case where "0" is set to a Buf2 control bit of region 1 drive capability register 401 even when region 1 access signal is at H level. At this time, OR circuit 413 outputs Buf2 output enable signal at L level to cause Buf2s (22-1 to 22-n) to be in high impedance. Moreover, AND circuit 405 outputs a signal at H level to OR circuit 413 in a case where region 1 access signal is at H level and "1" is set to Buf2 control bit of region 1 drive capability register 401. At this time, OR circuit 413 outputs Buf2 output enable signal at H level to enable outputs of Buf2s (22-1 to 22-n).

AND circuit 406 outputs a signal at L level to OR circuit 414 in a case where "0" is set to a Buf3 control bit of region 1 drive capability register 401 even when region 1 access signal is at H level. At this time, OR circuit 414 outputs Buf3 output enable signal at L level to cause Buf3s to be in high impedance. Moreover, AND circuit 406 outputs a signal at H level to OR circuit 414 in a case where region 1 access signal is at H level and "1" is set to Buf3 control bit of region 1 drive capability register 401. At this time, OR circuit 414 outputs Buf3 output enable signal at H level to enable outputs of Buf3s.

Note that n Buf3s are provided correspondingly to bus signals 1 to n shown FIG. 1, bus signals 1 to n are connected to respective data input terminals, output terminals 1 to n are connected to respective data output terminals and Buf3 output enable signal is connected to output enable terminals.

AND circuits 407, 409 and 411 control outputs of Buf2s (22-1 to 22-n) performing operations similar to AND circuit 405. Furthermore, AND circuits 408, 410 and 412 control outputs of Buf3s performing operation similar to AND circuit 406. Therefore, no detailed description will be repeated.

For example, in a case where drive capabilities of Buf1 to Buf3 are equal to each other, a bus signal is driven by a drive capability equal to a drive capability of Buf1 if "0" is set to Buf2 control bit and "0" is set to Buf3 bit. In the case, if "1" is set to Buf2 control bit and "0" is et to Buf3 control bit, a bus signal is driven by a drive capability twice as large as the drive capability of Buf1. In the case, if "0" is set to Buf2 control bit and "1" is set to Buf3 control bit, a bus signal is driven by a drive capability twice as large as the drive capability of Buf1. Further, in the case, if "1" is set to Buf2 control bit and "1" is set to Buf3 control bit, a bus signal is driven by a drive capability three times as large as the drive capability of Buf1.

In a case where drive capabilities of Buf1 and Buf2 are equal to each other and a drive capability of Buf3 is twice as large as a drive capability of Buf2 (Buf1), a bus signal is driven by a drive capability equal to a drive capability of Buf1 if "0" is set to Buf2 control bit and "0" is set to Buf3 bit. In the case, if "1" is set to Buf2 control bit and "0" is et to Buf3 control bit, a bus signal is driven by a drive capability twice as large as the drive capability of Buf1. In the case, if "0" is set to Buf2 control bit and "1" is set to Buf3 control bit, a bus signal is driven by a drive capability three times as large as the drive capability of Buf1. Further, in the case, if "1" is set to Buf2 control bit and "1" is set to Buf3 control bit, a bus signal is driven by a drive capability four times as large as the drive capability of Buf1.

Note that while in this embodiment, driving of Buf1s (21-1 to 21-n), Buf2s (22-2 to 22-n) and Buf3s is controlled according to values set in region 1 drive capability register 401, region 2 drive capability register 402, region 3 drive capability register 403 and region 4 drive capability register 404, driving of Buf1s (21-1 to 21-n), Buf2s (22-2 to 22-n) and Buf3s may be controlled by setting values directly to external pins instead of use of registers.

According to the bus control device in this embodiment, as described above, since bus control circuit 11d controls driving of Buf1s (21-1 to 21-n), Buf2s (22-2 to 22-n) and Buf3s according to values set in region 1 drive capability register 401, region 2 drive capability register 402, region 3 drive capability register 403 and region 4 drive capability register 404 and to which of region 1 to region 4 an access is made to, it is enabled to set a drive capability and a region for which a drive capability is altered in a finer and more divided manner in addition to the effect described in the first embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A bus control device comprising:
a plurality of output buffers connected to respective bus signals;
an access destination determining section determining to which of a plurality of regions an access is made;
a drive capability register in which a drive capability of a bus is set correspondingly to said plurality of regions; and
a logic circuit altering a drive capability of the bus by controlling said plurality of output buffers on the basis of a result of determination by said access destination determining section and the drive capability of the bus set in said drive capability register.

2. A bus control device comprising:
a plurality of output buffers connected to respective bus signals;
a number-of-waits register in which the number of bus waits is set;
a wait threshold value register in which a threshold value of the number of bus waits is set; and a logic circuit altering a drive capability of a bus by controlling said plurality of output buffers on the basis of a result of comparison between the number of bus waits set in said number-of-waits register and the threshold value of the number of bus waits set in said wait threshold value register.

3. The bus control device according to claim 2, further comprising:
an access destination determining section determining to which of a plurality of regions an access is made;
a plurality of number-of-waits registers in which the numbers of bus waits corresponding to said plurality of regions are set; and
a plurality of wait threshold value registers in which threshold values of the numbers of bus waits corresponding to said plurality of regions are set, wherein
said logic circuit alters the drive capability of the bus by controlling said plurality of output buffers on the basis of a result of comparison between the number of bus waits set in a number-of-waits register and a threshold value of the number of waits set in a wait threshold value register, both corresponding to the region determined by said access destination section.

4. The bus control device according to claim 2, wherein said logic circuit controls said plurality of output buffers so that the drive capability of the bus increases in a case where the number of bus waits set in said number-of-waits register is smaller than the threshold value of the number of bus waits set in said wait threshold value register, and
said logic circuit controls also controls said plurality of output buffers so that the drive capability of the bus decreases in a case where the number of bus waits set in said number-of-waits register is equal to or larger than the threshold value of the number of bus waits set in said wait threshold value register.

5. A bus control device comprising:
a plurality of output buffers connected to respective bus signals;
a frequency threshold value register in which a threshold value of a bus operating frequency is set;
a logic circuit altering a drive capability of a bus by controlling said plurality of output buffers on the basis of a result of comparison between a bus operating frequency and the threshold value of the bus operating frequency set in said frequency threshold value register;
and automatic switch permission register in which information indicating whether or not automatic switching between drive capabilities of the bus is permitted according to said bus operating frequency is stored; and
a fixed drive capability register in which a fixed value of the drive capability of the bus is set, wherein said logic circuit alters the drive capability of the bus by controlling said plurality of output buffers according to the fixed value set in said fixed drive capability register in a case where prohibition of automatic switching is set in said automatic switch permission register.

6. The bus control device according to claim 5, wherein said logic circuit controls said plurality of output buffers so that the drive capability of the bus increases in a case where said bus operating frequency is larger than the threshold value of the bus operating frequency set in said frequency threshold value register, and
said logic circuit also controls said plurality of output buffers so that the drive capability of the bus decreases in a case where said bus operating frequency is equal to or smaller than the threshold value of the bus operating frequency set in said frequency threshold value register.

* * * * *